United States Patent [19]
Merabet

[11] Patent Number: 6,149,954
[45] Date of Patent: Nov. 21, 2000

[54] MICROWAVE THAWING USING MICRO-EMULSIONS

[75] Inventor: Mustapha Merabet, Blonay, Switzerland

[73] Assignee: Nestec S.A., Vevey, Switzerland

[21] Appl. No.: 09/331,257

[22] PCT Filed: Dec. 15, 1997

[86] PCT No.: PCT/EP97/07154

§ 371 Date: Jun. 18, 1999

§ 102(e) Date: Jun. 18, 1999

[87] PCT Pub. No.: WO98/26672

PCT Pub. Date: Jun. 25, 1998

[30] Foreign Application Priority Data

Dec. 19, 1996 [EP] European Pat. Off. ............. 96203642

[51] Int. Cl.[7] .................. A23L 3/36; B01F 17/00
[52] U.S. Cl. .................. 426/100; 426/241; 426/243; 426/602; 426/524; 516/21
[58] Field of Search .................. 426/100, 241, 426/243, 602, 524; 516/21

[56] References Cited

U.S. PATENT DOCUMENTS 5,043,173 8/1991 Steinke et al. ............................ 426/94
5,045,337 9/1991 El-Nokaly et al. ..................... 426/602

FOREIGN PATENT DOCUMENTS 63-056259 2/1988 Japan .
2297759 8/1996 United Kingdom .
94/19000 9/1994 WIPO .

OTHER PUBLICATIONS

Patent Abstracts of Japan, vol. 012, No. 275 (C–516), Jul. 29, 1988 and JP 63056259 A (Asahi Denka Kogyo KK), Mar. 10, 1988.

*Primary Examiner*—Nina Bhat
*Attorney, Agent, or Firm*—Pennie & Edmonds LLP

[57] ABSTRACT

An edible water-in-oil micro-emulsion for thawing of a food product which is subjected to microwave energy and the use of such an edible water-in-oil micro-emulsion for thawing is described. Further described is a frozen food product comprising an edible water-in-oil micro-emulsion effective for enhancing thawing of the food product and to the process of providing such a frozen food product.

22 Claims, 2 Drawing Sheets

0.1304 TO 19.5993 GHz

MICROWAVE THAWING USING MICRO-EMULSIONS

This application is a 371 of PCT/EP97/07154, filed Dec. 15, 1997.

TECHNICAL FIELD

The present invention relates to an edible water-in-oil micro-emulsion for thawing of a food product which is subjected to microwave energy and the method of use of such an edible water-in-oil micro-emulsion for thawing. The invention also relates to a frozen food product comprising an edible water-in-oil micro-emulsion effective for enhancing thawing of the food product, and to the process of providing such a frozen food product.

BACKGROUND OF THE INVENTION

For most applications frozen food needs to be brought to the melting temperature before further processing, such as cutting, recipe formulation or cooking can take place. Thawing of frozen food in the household or on an industrial scale is traditionally done by leaving the food material (e.g. at −20 to −30° C.) for a period to thaw in at least ambient temperature. In a factory environment blocks of frozen food e.g. raw fish, meat, poultry, vegetables at −20 to −30° C., are conventionally left in thawing cells wherein the energy is transmitted to the product by convection or conduction.

An alternative to these conventional thawing methods is to thaw the frozen product by microwave energy. The frozen product is placed in a special applicator and subjected to the application of short microwave pulses. The use of pulsed microwave power is dictated by the very low values of the thermal diffusivity of the frozen products and the requirement of long equilibrium times after each pulse in order to avoid excessive heating of parts of the food products. Depending on the size and nature of the frozen product, the processing time when subjected to microwave energy at 2.45 GHz generally ranges from 30 min. to a couple of hours for a 500 to 5000 grams block.

The above discussed thawing methods however suffer from serious drawbacks in that they are relatively slow and that they do not provide a uniform thawing of the food product.

SUMMARY OF THE INVENTION

It has surprisingly been found that, by treating a food product in accordance with the invention, the food product may be rapidly and uniformly thawed.

Accordingly, the present invention provides an edible water-in-oil micro-emulsion for thawing of a food product. The water-in-oil micro-emulsion when at a temperature below 0° C. comprises water in super cooled state which, when subjected to microwave energy at a temperature below 0° C., acts as a microwave energy absorber.

According to the present invention it has been found that the low thermal diffusivity can be compensated by direct deposition of microwave energy everywhere in the frozen product. The invention may allow a uniform heating patent, and the application of a continuous full power microwave energy is then possible, and permits rapid heating without any need for equilibrium times after microwave application. For example, the thawing time for a conventional 1000 grams block of poultry is about 30 min while a similar block treated according to the invention is thawed in about 10 min.

Furthermore, the invention aims to provide an edible micro-emulsion having the above described characteristics while being "neutral" in terms of induced taste and release of flavour.

In the present context a micro-emulsion is a substantially thermodynamically stable dispersion of at least two immiscible liquids (phases) containing an appropriate amount of surface active agents (surfactants and co-surfactants). When put together, the two immiscible liquids separate rapidly. The addition of surfactants in right amounts, and if necessary also co-surfactants, would lead to the formation of interfacial layers between the two phases, thus lowering the interfacial tension between the two phases down to about zero, which is the condition required for coexistence at equilibrium of the two phases. The dispersed phase is characterised by a droplet size in the range of 0.01 to 0.5 $\mu$m.

The micro-emulsion according to the invention is a water-in-oil micro-emulsion i.e. dispersion of aqueous droplets in an oil continuous phase. It comprises surface active agents which reduce the interfacial tension between water and oil to close to zero.

It has been found that water-in-oil micro-emulsion has microwave energy absorption characteristics which make it highly suitable for thawing of food products when added to these. As it comprises super cooled water when the micro-emulsion is cooled to below 0° C. droplets of non-frozen or super cooled water may thus be dispersed or distributed in the frozen food product. The non-frozen water will act as a microwave energy absorber when the product is subjected to microwave energy and thus enhance the thawing of the product. The water-in-oil emulsion ability to comprise super cooled water at low temperature depends on the characteristics and the surfactant properties. It has been found that when using oil with low viscosity, it is possible to obtain super cooled water down to a temperature of −30° C. to −40° C. The preferred edible water-in-oil has the ability to act as a thawing enhancer at a temperature of −10° C., advantageously at a temperature of −20° C.

An edible water-in-oil micro-emulsion preferably comprises at least 70% oil by weight, of the micro-emulsion up to 10% water by weight of the micro-emulsion, and at least one surfactant. More preferably it comprises from 75 to 90% oil by weight of the micro-emulsion and 3 to 8% water by weight of the micro-emulsion.

In order to obtain a stable micro-emulsion using surface active agents allowed in food, it has been found that it is advantageous for the oil in the oil-in-water micro-emulsion to have a low interfacial tension against water that is below 0.1 N/m, preferably below 0.03 N/m. The low interfacial tension against water allows for a larger choice among food compatible surface active agents. Advantageously, the interfacial tension against water is below 0.0250 N/m, preferably in the range of 0.0230 to 0.006 N/m, more preferably in the range of 0.019 to 0.006 N/m, most preferably about 0.0185 N/m.

The oil may preferably have a viscosity ranging from 20 to 45 mPa.s., preferably from 27 to 35 mPa.s. As a comparison vegetable oils have a viscosity from about 70 mPa.s.

The oil is preferably a medium-chain triglyceride having C6–C18 fatty acids. Advantageously, the triglyceride has C8–C12 fatty acids, preferably C8–C10 fatty acids. One particularly suitable oil is triglyceride oil of fractionated C8–C10 coconut fatty acids. A suitable oil is a medium-chain-triglyceride composed of about 60% of C8 and about 40% of C10.

Surprisingly good micro-emulsion quality has been obtained with an oil comprising medium-chain triglyceride and additionally 5% linoleic acid. It is believed that due to the two polar heads of the linoleic acid the polarity of the molecules of the oil is increased allowing a better compatibility of such oil with the aliphatic chains of the surfactant.

Suitable commercially available oils are oils from the Miglyol® series from Hüls Aktiegesellschaft, Germany, and Delios® from Chemishe Fabric Grünau, Germany. For example, Miglyol® oils are available having an interfacial tension against water of 0.0185 N/m.

Preferred water-in-oil micro-emulsion comprises at least 70% oil by weight, preferably between 75 and 90% oil by weight of the micro-emulsion, and up to 10% water by weight, preferably from 3 to 8% water by weight of the micro-emulsion.

The water-in-oil micro-emulsion furthermore comprises at least one non-ionic lipophilic surfactant which is food grade or allowed as a food additive.

Advantageously, the surfactant is selected from the group consisting of polyglycerol esters, polysorbates and sorbitans. Particularly advantageous is/are polysorbate(s) which is/are polysorbate 81 and polysorbate 85 or a combination thereof, while sorbitan is advantageously selected from the group consisting of sorbitan 20 and sorbitan 80. The preferred polyglycerol ester is diglycerol monooleate. Such a diglycerol monooleate may e.g. be obtained from Danisco Ingredients, Denmark.

The polysorbates used are considered as direct food additives with a relatively high maximum level. For example, 10 g/kg of the final product for baking purposes European Union (EU) Standard. The value level allowed is not reached in our application of micro-emulsion. Hydrophile-Lipophile Balance (HLB) number for polysorbate 81 and 85, 10.0 and 11.0 respectively. In the micro-emulsion of the invention the surfactant accounts for about 1 up to about 20% by weight.

The sorbitans used are considered as indirect food additives, and their authorized max. level even low, e.g. 5 g/kg EU Standard, is not reached in ordinary use of the micro-emulsion. Sorbitan 20 and sorbitan 80 are oil soluble. HLB numbers for Sorbitan 20 and 80 (oil soluble) are 8.6 and 4.3 respectively.

The polyglycerol esters used are direct food additives, their authorized maximum level at 10 g/kg of product EU standard is not reached in the present application. The HLB number is about 7.

The invention also relates to the use of an edible water-in-oil micro-emulsion for thawing of a food product. The water-in-oil micro-emulsion comprises water in a supercooled state which when subjected to microwave energy at temperatures below 0° C. acts as a microwave energy absorber. The water-in-oil micro-emulsion is preferably of the above described type.

In a further aspect, the invention relates to a frozen food product comprising a water-in-oil micro-emulsion distributed in or on said food product which is effective for thawing of said food product, when subjected to microwave radiation. The water-in-oil micro-emulsion may advantageously be of the above described type. Conveniently, the edible water-in-oil emulsion constitutes 1 to 3% of the total weight of the food product, preferably about 2% of the total weight.

In addition the invention also relates to a process for providing a frozen food product with enhanced thawing abilities when it is subjected to microwave radiation, said process comprising the steps of providing a food product, providing an edible water-in-oil micro-emulsion as described above, distributing the edible water-in-oil micro-emulsion in or on the food product, and freezing the food product.

EXAMPLES

Example 1

Example of Formulations of Water-in-Oil Micro-Emulsion

Figure 1:
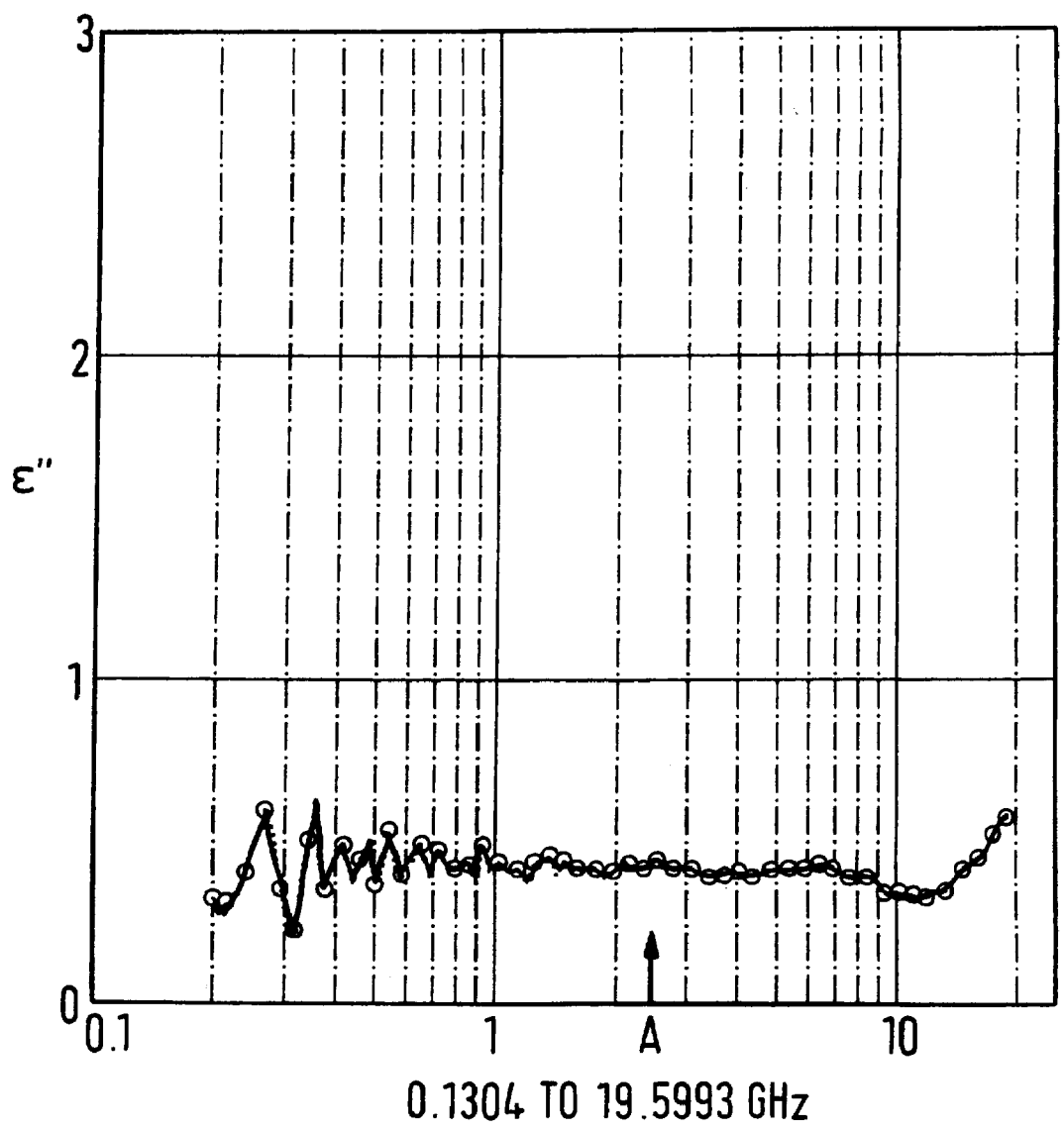
FIG. 1 is a diagram showing the dielectric absorption of a frozen food product.

Several micro-emulsions comprising diglycerol monooleate are prepared by mixing:

1) Medium-chain triglyceride oil composed of 60% of C8 fatty acids and 40% of C10 acids, the triglyceride constituting 76 to 90% by weight of the total micro-emulsion, 2) Diglycerol monooleate constituting 3 to 15% by weight, and 3) Water in an amount corresponding to 3 to 10% by weight.

A preferred micro-emulsion according to the invention is prepared by mixing:

82% medium-chain triglyceride by weight of the total micro-emulsion, which is composed by 60% C8 fatty acids and 40% C10 fatty acids and comprises 5% linoleic acid, 13% Diglycerol monooleate by weight, and 5% water by weight.

All mixtures are inspected and characterised as micro-emulsions.

Example 2

Example of Formulations of Water-in-Oil Micro-Emulsion

Micro-emulsions comprising sorbitan 80 are prepared by mixing:

1) Medium-chain triglyceride oil composed of 60% of C8 fatty acids and 40% of C10 fatty acids constituting 70 to 92% by weight of the total micro-emulsion, 2) Sorbitan 80 constituting 2 to 20% by weight, and 3) Water in an amount corresponding to about 6% by weight.

All mixtures are inspected and characterised as micro-emulsions.

Example 3

Example of Formulations of Water-in-Oil Micro-Emulsion

Several micro-emulsions comprising polysorbate 85 are prepared by mixing:

1) Medium-chain triglyceride oil composed of 60% of C8 fatty acids and 40% of C10 fatty acids constituting 80 to 88% by weight of the total micro-emulsion, 2) Polysorbate 85 constituting 6 to 20% by weight, and 3) Water in an amount corresponding to about 4% by weight.

All mixtures are inspected and characterised as micro-emulsions.

Example 4

Dielectric Absorption of Frozen Product

FIG. 1 shows the dielectric absorption of a frozen beef product at −20° C. The absorption curve is very low (about 0.5 over the microwave range) and is flat indicating that there is no specific absorption mechanism that can be amplified.

Example 5

Dialectric Absorption of Micro-Emulsion

Figure 2:
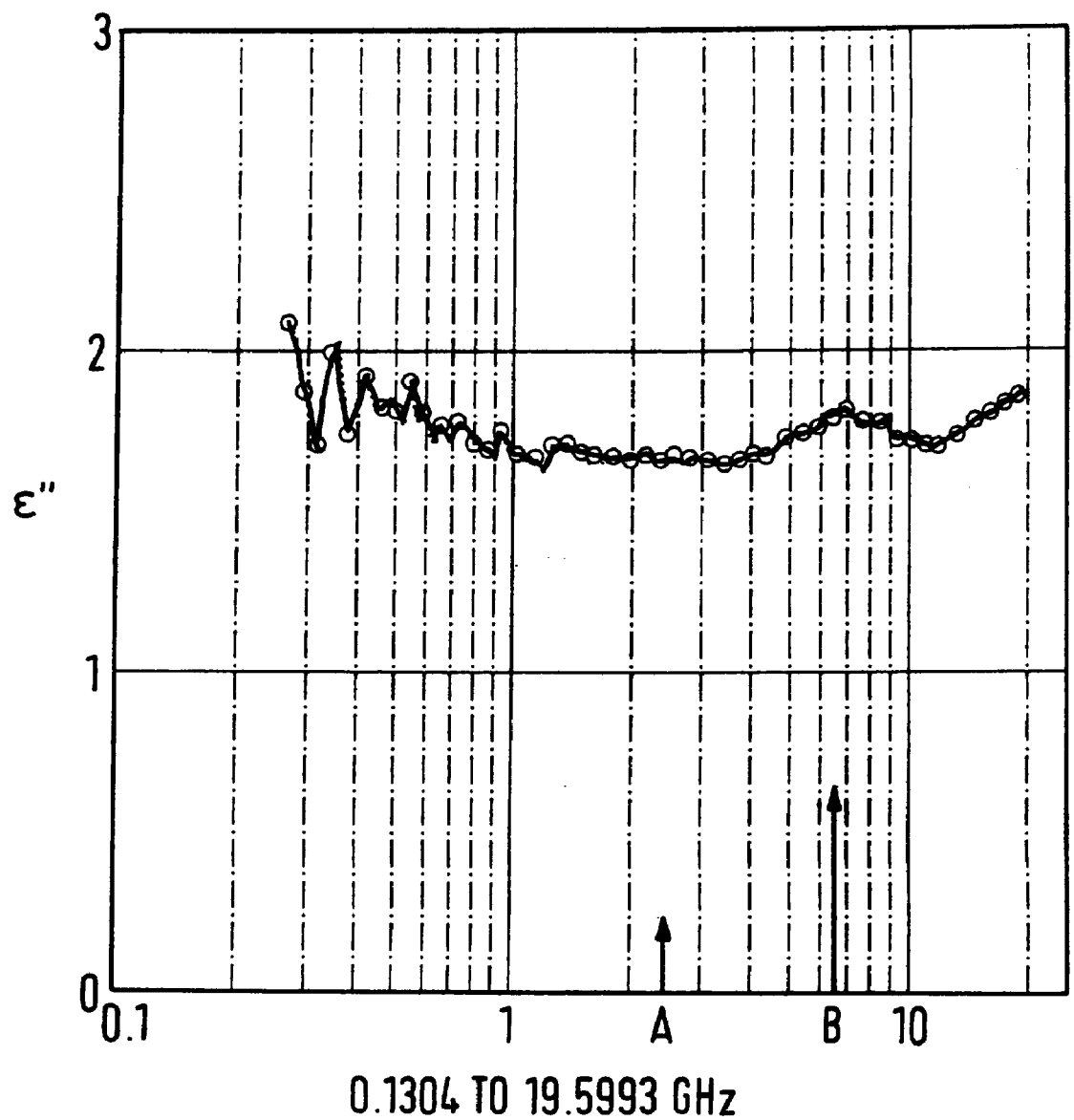
FIG. 2 is a diagram showing the dielectric absorption of water-in-oil micro-emulsion according to the invention at −20° C.

FIG. 2 shows the dielectric absorption $\epsilon^{11}$ of a water-in-oil micro-emulsion according to the invention at −20° C. The dielectric absorption $\epsilon^{11}$ of the water-in-oil micro-emulsion is found to be substantially identical to that of super cooled water.

At ambient conditions (pressure), super cooled water does not exist. It is only at higher pressure that water remains liquid below 0° C. However in the micro-emulsions, the dispersed water droplets remain liquid below 0° C. This can e.g. be shown with dielectric spectroscopy. Generally, the parameters of the super cooled water are obtained by extrapolation of the water characteristics above the freezing point. We use the Arrhanius plot above 0° C. to estimate the relaxation frequency of the super cooled water at any temperature below the freezing point.

The figures show that the absorption at the microwave heating frequency, 2.45 GHz (indicated with A), of the super cooled water is a stronger absorber (about 1.8) than of frozen food material (about 0.4) in FIG. 1. Therefore, the super cooled water being present in a frozen food material may enhance the thawing as it can be rapidly heated and the heat transmitted to the immediate surroundings.

Example 6

Dialectric Absorption of Micro-Emulsion in Example 1 to 3

Measurements furthermore show that water-in-oil micro-emulsions as those shown in Example 1 to 3 have a dielectric relaxation frequency in the microwave range, 1 to 10 GHz, has a critical frequency of about 6 to 7 GHz at −20° C. Water has a relaxation frequency of about 6.1 GHz (indicated with B) if it remains liquid in a super cooled state at −20° C. This clearly indicates that the dispersed droplets contain water which remains liquid even at −20° C.

The water-in-oil micro-emulsions have a behavior at −20° C. (the common freezing temperature of foods) which is quite similar. In all the 3 formulations, the dispersed water droplets do not freeze, and remain liquid in super cooled states. At −30° C., only Diglycerol monooleate based microemulsion is shown to be most advantageous in terms of microwave absorption.

Example 7

Providing a Frozen Food Product

Tests are carried out providing various types of frozen food products according to the invention. For example, we mix thoroughly about log of any of the preferred compositions of example 3 with 500 g of raw fish fillets. The mixture is frozen in a block to −20° C. or −30° C. In another test we mix thoroughly about 10 g of any of the preferred compositions of example 3 with 500 g of beef meat pieces. The mixture is frozen in a block to −20° C. or −30° C.

Frozen blocks of raw fish fillets and of beef meat pieces are prepared without the micro-emulsion according to the invention.

Example 8

Comparing Thawing Time

All the frozen blocks of example 7 treated and untreated blocks are thawed uniformly in a domestic microwave oven set at defrosting cycle to avoid excessive heating of the food product. The frozen food blocks without the micro-emulsion thawing improver according to the invention take 15 min to thaw to a temperature of about 0° C. while the frozen food blocks comprising the micro-emulsion are thawed in less than 6 min.

Subsequent to the thawing the treated and untreated blocks are cooked. Taste tests are carried out in order to evaluate whether any off-taste from the micro-emulsion is detectable. No off-taste is detectable from the block comprising the micro-emulsion.

What is claimed is:

1. An edible water-in-oil micro-emulsion for thawing a food product comprising:

droplets of an oil having an average droplet size between 0.01 μm to 0.5 μm with the oil being present in an amount of at least 70% by weight of the micro-emulsion; and water present in an amount which will achieve a super cooled state when the temperature of the micro-emulsion reaches below 0° C. but no greater than 10% by weight of the micro-emulsion;

wherein, when the micro-emulsion is added to a food product, cooled to below 0° C. and then subjected to microwave thawing, the super cooled water acts as a microwave energy absorber to facilitate thawing of the food product.

2. The micro-emulsion according to claim 1, further comprising at least one surfactant present in an of between about 1% to about 20% by weight of the micro-emulsion.

3. The micro-emulsion according to claim 1, wherein the oil is present in an amount of between 75% to 90% by weight, and the water is present in an amount of between 3% to 8% by weight.

4. The micro-emulsion according to claim 1, wherein the oil phase comprises a medium-chain triglyceride comprising fatty acids with between 6 carbon atoms to 18 carbon atoms.

5. The micro-emulsion according to claim 1, wherein the oil has a viscosity ranging between 20 mPa.s. and 45 mPa.s.

6. The micro-emulsion according to claim 1, wherein the surfactant is a non-ionic lipophilic surfactant.

7. The micro-emulsion according to claim 1, having an interfacial tension against water which is below about 0.1 N/m.

8. The micro-emulsion according to claim 7, wherein the interfacial tension against water is between 0.023 N/m to 0.006 N/m.

9. The micro-emulsion according to claim 1, wherein amount of water is such that it achieves a super cooled state when the temperature of the micro-emulsion falls below −10° C.

10. The micro-emulsion according to claim 4, wherein the triglyceride comprises fatty acids with between 8 carbon atoms to 12 carbon atoms.

11. The micro-emulsion according to claim 10, wherein the triglyceride comprises fatty acids with between 8 carbon atoms to 10 carbon atoms.

12. The micro-emulsion according to claim 10, wherein the fatty acids are fractionated coconut fatty acids comprising between 8 carbon atoms to 10 carbon atoms.

13. The micro-emulsion according to claim 10, wherein the fatty acid is a medium chain triglyceride comprising about 60% of a fatty acid having 8 carbon atoms and 40% of a fatty acid having 10 carbon atoms.

14. The micro-emulsion according to claim 10, further comprising 5% of linoleic acid.

15. The micro-emulsion according to claim 2, wherein the surfactant is a polysorbate, sorbitan, polyglycerol ester, or a combination thereof.

16. The micro-emulsion according to claim 15, wherein the polyglycerol ester is diglycerol monooleate.

17. A method of thawing a frozen food product comprising the steps of:

forming a water-in-oil micro-emulsion comprising droplets of an oil having an average droplet size between 0.01 µm to 0.5 µm with the oil being present in an amount of at least 70% by weight of the micro-emulsion and water present in an amount which will achieve a super cooled state when the temperature of the micro-emulsion reaches below 0° C. but no greater than 10% by weight of the micro-emulsion;

distributing the micro-emulsion in or upon a food product in an amount sufficient to facilitate thawing of the food product during microwave heating;

cooling the food product containing the micro-emulsion to a temperature sufficient to form a frozen food product; and subjecting the frozen food product to microwave radiation for a time sufficient to thaw the frozen food product, wherein the super cooled water of the micro-emulsion acts as a microwave energy absorber to facilitate thawing of the food product.

18. The method according to claim 17, wherein the food product is cooled to a temperature of below 0° C.

19. The method according to claim 17, wherein the food product is cooled to a temperature of below −10° C.

20. The method according to claim 17, wherein the food product is cooled to a temperature of below −30° C.

21. The method according to claim 17, wherein the micro-emulsion comprises between 1% to 3% of the total weight of the food product.

22. The method according to claim 17, wherein the micro-emulsion comprises about 2% of the total weight of the food product.

\* \* \* \* \*